(12) United States Patent
Ota et al.

(10) Patent No.: US 7,062,171 B2
(45) Date of Patent: Jun. 13, 2006

(54) MULTI-WAVELENGTH, BI-DIRECTIONAL OPTICAL MULTIPLEXER

(76) Inventors: Yusuke Ota, 215 Laurel Hill Rd., Mountain Lakes, NJ (US) 07046; Jian-Guang Chen, 6F, No. 8-2 Dacheing Street, Hsin Chu (TW) 300

( * ) Notice: Subject to any disclaimer, the term of this patent is extended or adjusted under 35 U.S.C. 154(b) by 0 days.

(21) Appl. No.: 10/885,568

(22) Filed: Jul. 6, 2004

(65) Prior Publication Data

US 2005/0013614 A1    Jan. 20, 2005

Related U.S. Application Data

(60) Provisional application No. 60/487,079, filed on Jul. 15, 2003.

(51) Int. Cl.
*H04J 14/00* (2006.01)

(52) U.S. Cl. .......................... 398/67; 398/66

(58) Field of Classification Search ............... 398/43, 398/66–73
See application file for complete search history.

(56) References Cited

U.S. PATENT DOCUMENTS

| | | | |
|---|---|---|---|
| 4,718,055 A | 1/1988 | Winzer | 370/3 |
| 4,767,171 A | 8/1988 | Keil et al. | 350/96.18 |
| 4,989,935 A | 2/1991 | Stein | 350/96.11 |
| 5,127,075 A | 6/1992 | Althaus et al. | 385/94 |
| 5,214,725 A | 5/1993 | Yanagawa et al. | 385/45 |
| 5,330,820 A | 7/1994 | Li et al. | 428/105 |
| 5,416,624 A | 5/1995 | Karstensen | 359/114 |
| 5,552,208 A | 9/1996 | Lin et al. | 428/113 |
| 5,552,918 A | 9/1996 | Krug et al. | 359/152 |
| 5,566,265 A | 10/1996 | Spaeth et al. | 385/93 |
| 5,574,584 A | 11/1996 | Darcie et al. | 359/125 |
| 5,587,230 A | 12/1996 | Lin et al. | 428/245 |
| 5,621,573 A | 4/1997 | Lewis et al. | 359/634 |
| 5,646,399 A | 7/1997 | Fukushima et al. | 250/226 |
| 5,796,899 A | 8/1998 | Butrie et al. | 385/92 |
| 5,838,859 A | 11/1998 | Butrie et al. | 385/92 |
| 5,841,562 A | 11/1998 | Rangwala et al. | 359/152 |
| 5,867,622 A | 2/1999 | Miyasaka et al. | 385/88 |
| 6,097,521 A | 8/2000 | Althaus et al. | 359/143 |
| 6,142,680 A | 11/2000 | Kikuchi et al. | 385/93 |
| 6,154,297 A | 11/2000 | Javitt et al. | 359/152 |
| 6,188,495 B1 | 2/2001 | Inoue et al. | 359/152 |

(Continued)

FOREIGN PATENT DOCUMENTS

GB    2 328 818    3/1999    ............... 10/24

(Continued)

*Primary Examiner*—Jason Chan
*Assistant Examiner*—David Lee
(74) *Attorney, Agent, or Firm*—Ernest D. Buff & Associates, LLC; Ernest D. Buff; Gordon E. Fish

(57) ABSTRACT

An optical network unit is associated with a multi-wavelength optical fiber communications system carrying low-power digital signals bidirectionally transmitted at a first and a second wavelength and a high-power analog video signal transmitted at a third wavelength. The unit comprises a housing having a connection for the optical fiber; and an optical filter, first and second optical units, and a beam splitter mounted in the housing. The optical filter is interposed between the fiber termination and the second optical unit, and is adapted to block light of the third wavelength but bidirectionally transmit light of the first and second wavelengths. The system is readily implemented, and any combination of the data and video services may be selected. A high level of skill is not required for changing the combination of services procured.

10 Claims, 5 Drawing Sheets

U.S. PATENT DOCUMENTS

| | | |
|---|---|---|
| 6,201,908 B1 | 3/2001 | Grann .................. 385/24 |
| 6,252,719 B1 | 6/2001 | Eichenbaum ............ 359/634 |
| 6,334,716 B1 | 1/2002 | Ojima et al. ............ 385/89 |
| 6,353,491 B1 | 3/2002 | Tanaka et al. .......... 359/152 |
| 6,385,374 B1 | 5/2002 | Kropp .................. 385/47 |
| 6,453,089 B1 | 9/2002 | Cao .................... 385/31 |
| 6,493,121 B1 | 12/2002 | Althaus ............... 359/152 |
| 6,509,989 B1 | 1/2003 | Tsumori ............... 359/152 |
| 6,570,692 B1* | 5/2003 | Doucet et al. .......... 398/121 |
| 6,574,236 B1 | 6/2003 | Gosselin et al. ........ 370/465 |
| 6,731,873 B1* | 5/2004 | Zuhdi et al. ........... 398/41 |
| 2002/0021872 A1 | 2/2002 | Althaus et al. ......... 385/88 |
| 2002/0063924 A1* | 5/2002 | Kimbrough et al. ...... 359/125 |
| 2002/0110313 A1 | 8/2002 | Anigbo et al. ......... 385/24 |
| 2002/0196491 A1* | 12/2002 | Deng et al. ........... 359/124 |
| 2003/0053769 A1 | 3/2003 | Shunk ................. 385/93 |
| 2003/0067658 A1 | 4/2003 | Althaus et al. ........ 359/163 |
| 2003/0072542 A1 | 4/2003 | Furuichi et al. ....... 385/93 |
| 2003/0076560 A1* | 4/2003 | Pratt et al. .......... 359/125 |
| 2004/0175177 A1* | 9/2004 | Lee et al. ............ 398/72 |
| 2004/0184811 A1* | 9/2004 | Takamori .............. 398/141 |

FOREIGN PATENT DOCUMENTS

| | | | |
|---|---|---|---|
| JP | 04096435 | 3/1992 | ......... 10/2 |
| JP | 06130257 | 5/1994 | ......... 6/42 |
| JP | 10215227 | 8/1998 | ......... 10/24 |

* cited by examiner

MULTI-WAVELENGTH, BI-DIRECTIONAL OPTICAL MULTIPLEXER

This application claims the benefit of Application No.: 60/487,079, filed Jul. 15, 2003.

BACKGROUND OF THE INVENTION

1. Field of the Invention

The present invention relates to an optical multiplexer; and more particularly, to a multi-wavelength, bi-directional optical multiplexer useful in an optical fiber data transmission system.

2. Description of the Prior Art

Transmission of data by optical fiber waveguides, also called fiber optics or optical fibers, has become ubiquitous in the telecommunications and computer industries. Digital information in an electronic system is converted into a series of pulses of light generated by laser diodes (LD's) or light emitting diodes (LED's), which are injected into long fibers of glass or polymeric materials. The fibers are capable of propagating the light with extremely low losses and acceptably low dispersion, whereby information embodied in the modulation pattern may be conveyed. The light that emerges from the other end of the fiber can be detected and reconverted into electronic signals that faithfully reproduce the original signal.

Fiber optic communication has a number of advantages over traditional transmission means such as hard-wired coaxial and twisted pair cables and lower frequency electromagnetic broadcasting of radio and television signals. Foremost is the much larger bandwidth available. In addition, existing infrastructure such as cable ducts, utility poles, and the like presently used by telecommunications and cable television (CATV) companies can be upgraded with relatively little disruption and moderate cost by substituting optical fiber cable for existing copper wire. Thus, dramatic increases in bandwidth needed to accommodate the needs of an information-based, Internet-driven society and commerce can be obtained with comparatively little disruption.

While fiber optic-based communications has become commonplace for trunk lines in the telephone system, e.g. for long-distance telephone and data transmission and linking central offices, the final connection of these services to homes, businesses, and other service users is still largely done with conventional electrical wiring. In addition, a large fraction of households subscribe to CATV services that distribute plural television channels via coaxial cable. Some CATV providers also offer data connections, e.g. to the Internet. While coaxial service provides a much wider bandwidth than ordinary twisted-pair wires, many customers crave even greater bandwidth. A distribution system implemented with fiber optic service potentially can provide the enough bandwidth for: (i) high data rate communications, e.g. via the Internet; and (ii) enhanced CATV video services, e.g. movies on demand to complement conventional broadcasting.

Ideally, a system would employ a single optical fiber to serve an optical network unit (ONU) located in or near each customer's premises. The fiber would bi-directionally carry a full range of the communication forms that customers desire, including telephone, data, and video. In addition, such a system should be inexpensive, flexible, and compatible with existing communications infrastructures and protocols to the greatest possible extent.

The effective bandwidth of a given optical fiber can further be expanded by wavelength multiplexing, wherein plural communications channels are carried as modulated light of different wavelengths simultaneously propagating in a single fiber. Bi-directional or full-duplex transmission is easily handled in a multiplexed system by assigning different wavelength channels simultaneously usable for upstream and downstream transmission. However, the practical implementation of multiplexed systems depends on the availability of suitable multiplexing converters that separate the different wavelengths and translate optical signals to and from corresponding electrical impulses.

Protocols and equipment parameters for telecommunications systems are frequently specified by relevant government and international agencies, such as the International Telecommunications Union (ITU), and by recognized technical societies that promulgate standards, such as the Institute of Electrical and Electronics Engineers (IEEE). Several current ITU and IEEE standards, including ITU-T Standards G983.1 and G984.2 and IEEE Standards 802.3ah, relate to multiplexed optical fiber communications. Each of the aforesaid ITU and IEEE standards is hereby incorporated in the entirety by reference thereto. The standards all entail multiplexing light signals bearing both low-power, bidirectional digital data and high-power analog CATV video content. A wavelength of 1.55 µm is specified for the high-power analog video signal, with low-power digital data download to the user at 1.49 µm and digital data upload at 1.31 µm. These three wavelengths are readily propagated with low loss and dispersion in known single-mode optical fibers. While these protocols provide the services widely demanded by users, their implementation in a practical, cost-effective manner presents significant challenges, most notably the separation of the low and high power signals with adequate immunity to cross-talk. The power levels of the respective incoming signals are often 30 dB or more different. The allowable cross-talk level must therefore be at least about 10 dB below the sensitivity of the low-power receiver, which is often about −30 dBm. At that level, the low-power data is sufficiently immune to noise originating in the video signal. These standards provide for data communications at data rates that desirably are as high as 1.25 Gb/s or more in both upstream and downstream directions.

Furthermore, different customers for a multiplexed, combined video and data service have different needs and desires for service levels. In particular, it would be valuable to offer the video and data services either singly or in combination, since some customers would have little desire for both and accordingly would not be inclined to pay for the full range of features.

SUMMARY OF THE INVENTION

In one aspect, the present invention provides an optical network unit particularly adapted for use in a communications system for bidirectional data transmission through an optical fiber. The fiber has a longitudinal axis and a fiber end and carries low-power digital signals bidirectionally transmitted at a first and a second wavelength and a high-power analog video signal transmitted at a third wavelength. The unit comprises a housing having a connection for the optical fiber; and an optical filter, first and second optical units, and a beam splitter mounted in the housing. The optical filter is interposed between the fiber end and the beam splitter, and is adapted to block light of the third wavelength but bidirectionally transmit light of the first and second wavelengths. The first optical unit is disposed along the longitudinal axis and comprises a transmitter including an input for receiving a transmission electrical signal and a light source for emitting light at the first wavelength along the longitudinal axis through the beam splitter and the filter into the optical fiber, the light being modulated by the transmission electrical signal. The second optical unit is disposed adjacent the longitudinal axis and comprises a receiver including a light detector for receiving modulated light of the second wavelength and an output, the receiver detecting the modulated light incident on the light detector and converting the modulated light into a received electrical signal at the output. The beam splitter is disposed obliquely along the longitudinal axis and diverts at least a portion of the second wavelength light incident thereon from the optical filter into the second optical unit and passes at least a portion of the light of the first wavelength emitted by the first optical unit into the optical fiber.

The present optical network unit is beneficially employed in providing a multiplexed, multi-wavelength data communications system that allows one optical fiber to carry both digital data and analog video program content, such as a CATV service. The digital data is capable of including bidirectional voice telephony and data feeds, such as connectivity to computer networks such as the Internet. The system is capable of data transmission at rates of up to about 1.25 Gb/s in accordance with standard protocols.

The system is readily and economically implemented. In addition, the system can service users who require the aforementioned data and video feeds either singly or in combination. Advantageously, users who do not need the video feed are furnished a simple, inexpensive multiplexer, which is far less costly than prior-art, three-port multiplexers affording all the capabilities. However, the video feed can be added later if desired by simply adding an additional video module that may be provided with simple connectors, so that a high level of skill is not required for its installation.

BRIEF DESCRIPTION OF THE DRAWINGS

The invention will be more fully understood and further advantages will become apparent when reference is had to the following detailed description of the various embodiments of the invention and the accompanying drawings, wherein like reference numerals denote similar elements throughout the several views, and in which.

DETAILED DESCRIPTION OF THE INVENTION

Figure 2:
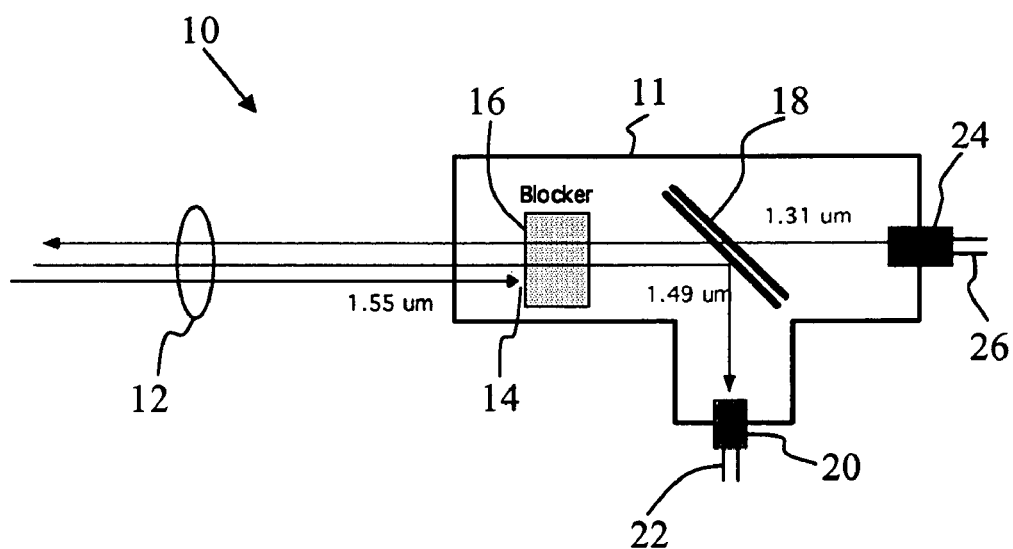
FIG. 2 schematically depicts an optical network unit of the invention comprising a bi-directional optical multiplexer.

In one embodiment, the present invention provides an optical network unit designated as an "ONU-A" type, including a modular, bi-directional optical multiplexer depicted generally at 10 in FIG. 2. The unit is contained in housing 11 and is connected to a service provider through incoming optical fiber 12 adapted to carry light signals bi-directionally. Light emerges from the end 14 of fiber 12 along a primary optical axis and passes through blocking filter 16 which strongly attenuates light of a third wavelength ($\lambda_3$) but passes light of first and second wavelengths ($\lambda_1$ and $\lambda_2$). Preferably the wavelengths satisfy the relationship $\lambda_1 < \lambda_2 < \lambda_3$. More preferably, the wavelengths are 1.31, 1.49, and 1.55 µm, respectively. As used herein and in the subjoined claims, and in accordance with conventional parlance in the fiber optics art, the term "light" is employed for electromagnetic radiation of radiation of the foregoing wavelengths, even though they fall in the infrared, outside the range visible to humans. In a preferred embodiment, filter 16 provides an insertion loss for $\lambda_1$ and $\lambda_2$ light that is at most about 0.5 dB, while the attenuation of $\lambda_3$ light is at least about 45 dB. One suitable form of filter 16 comprises a multilayer structure having four dielectric layers.

Light emerging from filter 16 then impinges on the front portion of wavelength-selective beam splitter 18 mounted at an angle of about 45° relative to the primary optical axis. Light of wavelength $\lambda_2$ is deflected at an angle of about 90° relative to the optical axis and enters a receiver comprising detector 20 mounted in housing 11. Detector 20, which preferably is a conventional photodiode but may be any other suitable light-responsive circuit element, converts the $\lambda_2$ light modulated by the incoming data signal to corresponding electrical impulses which are formed into an electrical data output signal by the receiver and provided at connector 22. Optionally detector 20 is fabricated on a common substrate as part of an integrated circuit that the receiver uses to perform known signal conditioning functions. Housing 11 also incorporates a transmitter including light source 24, such as a light emitting diode (LED) or, preferably, a semiconductor laser diode, which emits light generally along the primary optical axis. More preferably, a Fabry Perot-type semiconductor laser is used for its low cost and adequately high wavelength stability. The transmitter, including source 24, is energized through connector 26 with an electrical input data signal to produce $\lambda_1$ light modulated in correspondence with the input signal. This light emerges from source 24 along the primary optical axis and enters splitter 18 through its back face. The light then passes through both back and front portions of splitter 18 and blocking filter 16 with minimal attenuation and thence is injected into fiber 12. Ordinarily, the input and output signals are digital data signals that are provided to and from a router, general purpose computer, or like unit for processing in conventional ways. Preferably, the blocking filter, splitter, and transmitter and receiver are enclosed within a common housing. Splitter 18 substantially reflects $\lambda_2$ light incident on its front face, but transmits $\lambda_1$ light incident on its rear face. A multi-layer dielectric structure having these characteristics and known to those skilled in the art is preferably used. In an alternative embodiment of the multiplexer 10, filter 16 may be located between beam splitter 18 and detector 20. In this configuration filter 16 is required to block $\lambda_3$ light, but need pass only $\lambda_2$ light.

Figure 3:
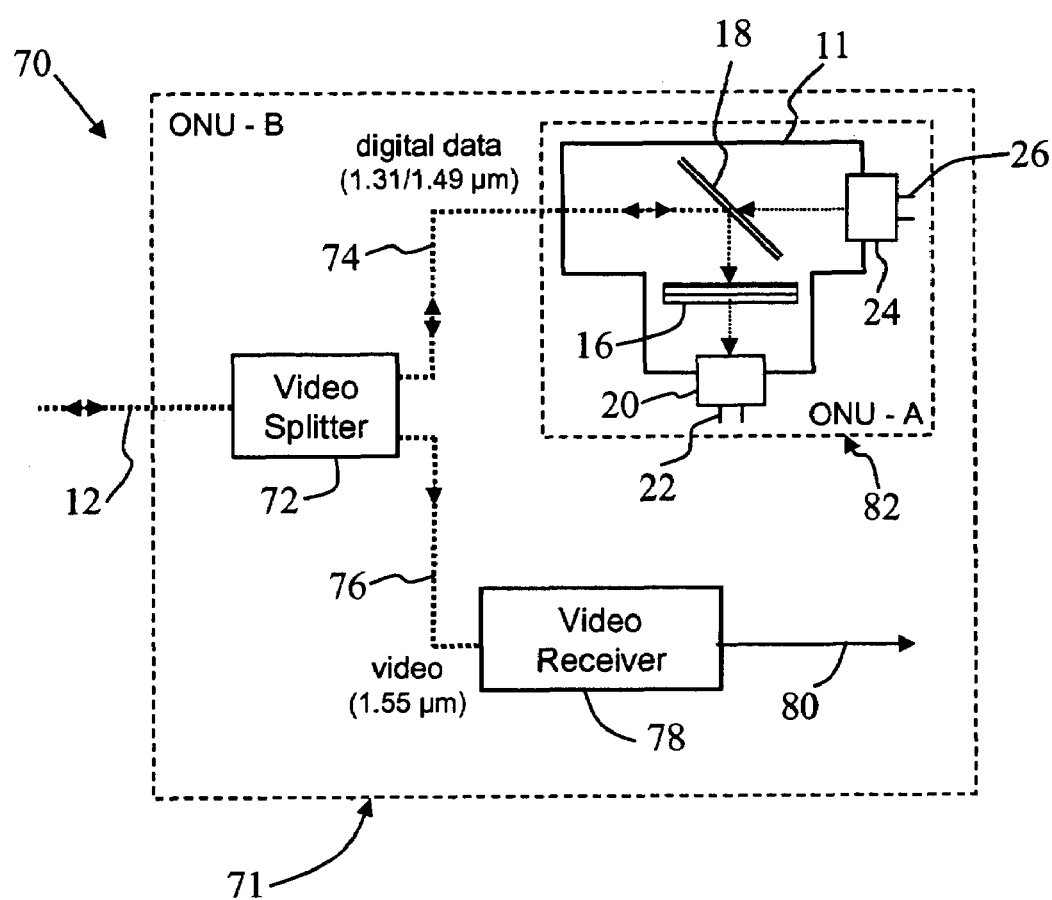
FIG. 3 schematically depicts another form of an optical network unit of the invention comprising the multiplexer also seen in FIG. 2, along with an auxiliary video channel.

Another form of the optical network unit of the invention, designated as an "ONU-B" type and illustrated generally at 70 in FIG. 3, comprises a multiplexer having the functionality of the ONU-A type optical network unit depicted by FIG. 2, along with an auxiliary video channel. Video splitter 72 is connected to incoming optical fiber 12. Splitter 72 directs at least a portion of the incident, high-power analog video signal in fiber 12 to video receiver 78 through video output fiber 76. Video receiver 78 includes a video light detector that converts the analog modulated video signal incident through fiber 12 into electrical impulses at output 80 that are suitable as input to a conventional television or radio receiver, or a video monitor. Optionally, video receiver 78 further includes video amplifiers or other known circuitry for suitably processing the output of the video light detector into an electrical signal appropriate as input for the aforementioned video devices. The video light detector is preferably a photodiode, but may also be any other suitable light-responsive circuit element.

In a preferred embodiment, video splitter 72 employs a wavelength division multiplexing (WDM) mirror to divert at least a preponderance of the high power $\lambda_3$ component of the incident light to video output fiber 76, while at least a preponderance of the incident $\lambda_2$ light passes through data output fiber 74 to the bidirectional multiplexer of ONU-A 82. In some embodiments video splitter 72 and video receiver 78 are located external to a housing enclosing the components of the multiplexer providing the ONU-A functionality. Preferably video splitter 72 and video receiver 78 are themselves enclosed in a housing to form a self-contained video module that can easily be attached to, or removed from the ONU-A bidirectional module 82. The video splitter 72 need not provide any substantial isolation or blocking of the $\lambda_1$ and $\lambda_2$ signals from video output fiber 76, since their power level is sufficiently low that they do measurably degrade the signal to noise ratio of the video signal transmitted in video output fiber 76 at $\lambda_3$.

The ONU-A module 82 included in the embodiment depicted by FIG. 3 is constructed with blocking filter 16 disposed between the beam splitter 18 and the receiver that includes detector 20. In this position, filter 16 is required to block the high-power, 1.55 μm video signal and need only pass the low-power, 1.49 μm light bearing the incoming digital data.

Video interface 72 provides at output 80 an electrical signal of a type suitable for connection to a conventional radio, television receiver, or monitor. The ONU-B unit 71 advantageously furnishes both data communications and video signals, allowing it to be used in providing service to a system customer desiring both modalities.

Both ONU-A and ONU-B units may further comprise alignment adjustments and lenses and other known optical components for focusing and directing the optical beams. Any form of lens may be used, including spherical and aspherical types and graded index, self-focusing lenses.

Figure 1:
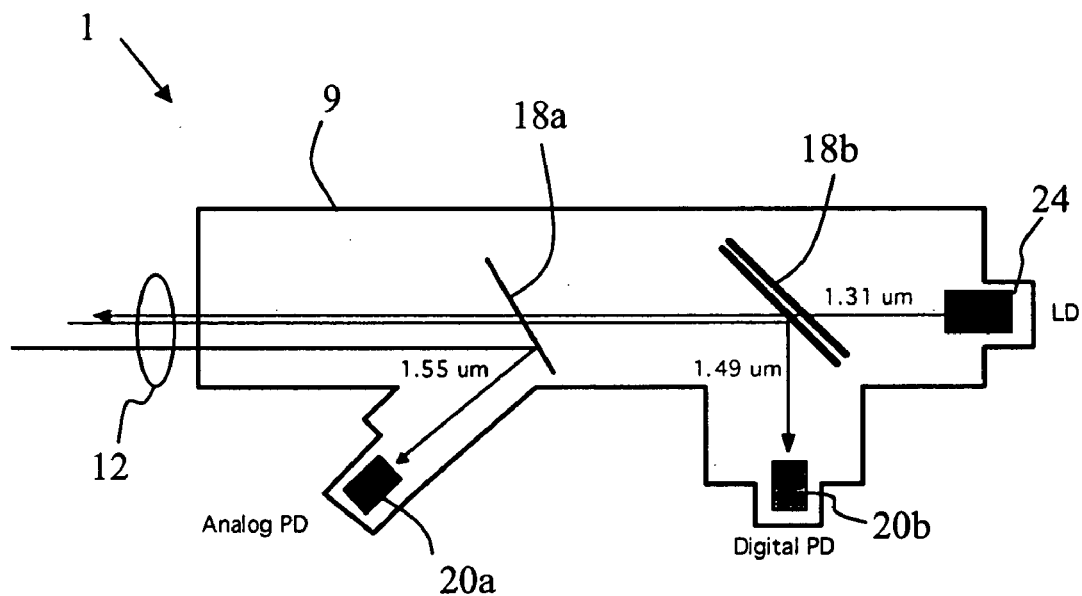
FIG. 1 schematically depicts a prior art optical multiplexer having ports for three optical wavelengths.

Referring now to FIG. 1, there is shown generally at 1 a prior art multiplexer adapted to process optical signals of three wavelengths $\lambda_1$, $\lambda_2$, and $\lambda_3$. However, the multiplexer depicted in FIG. 1 is significantly more costly and difficult to build than the multiplexer of the present invention, e.g. as shown in either FIG. 2 or FIG. 3. Multiplexer 1 is adapted for connection to a service provider through optical fiber 12. Light emerging from fiber 12 along an optical axis first impinges on first wavelength selective beam splitter 18a that diverts a preponderance of the $\lambda_3$ light coming from the service provider into first optical detector 20a. Light of wavelengths $\lambda_1$ and $\lambda_2$ passes bidirectionally through first beam splitter 18a. Incoming $\lambda_2$ light emerging from first beam splitter 18a impinges on second wavelength selected beam splitter 18b and is diverted to second optical detector 20b. Light source 24 is adapted to emit $\lambda_1$ light modulated in correspondence to an electrical input signal. The light passes along the optical axis and through splitters 18a and 18b with minimal attenuation and thence is injected into fiber 12. Multiplexer 1 has integral capability of converting separating and photodetecting incident light of both $\lambda_2$ and $\lambda_3$ wavelengths. However, to use multiplexer 1 in the aforedescribed protocol, wherein the $\lambda_3$ signal is ordinarily as much as 30 dB stronger than the $\lambda_2$ signal, first beam splitter 18a must have very high selectivity for $\lambda_3$ light. Preferably the selectivity is at least 40 dB to provide an acceptably low level of cross-talk of the $\lambda_3$ signal into the $\lambda_2$ channel and second detector 20b. Achieving such a high selectivity in practice requires that wavelength-selective beam splitter 18a be positioned and angulated with very high precision. As a result, the manufacture of housing 9 and the mount for splitter 18a is quite expensive and must be accomplished by highly skilled personnel.

Figure 4:
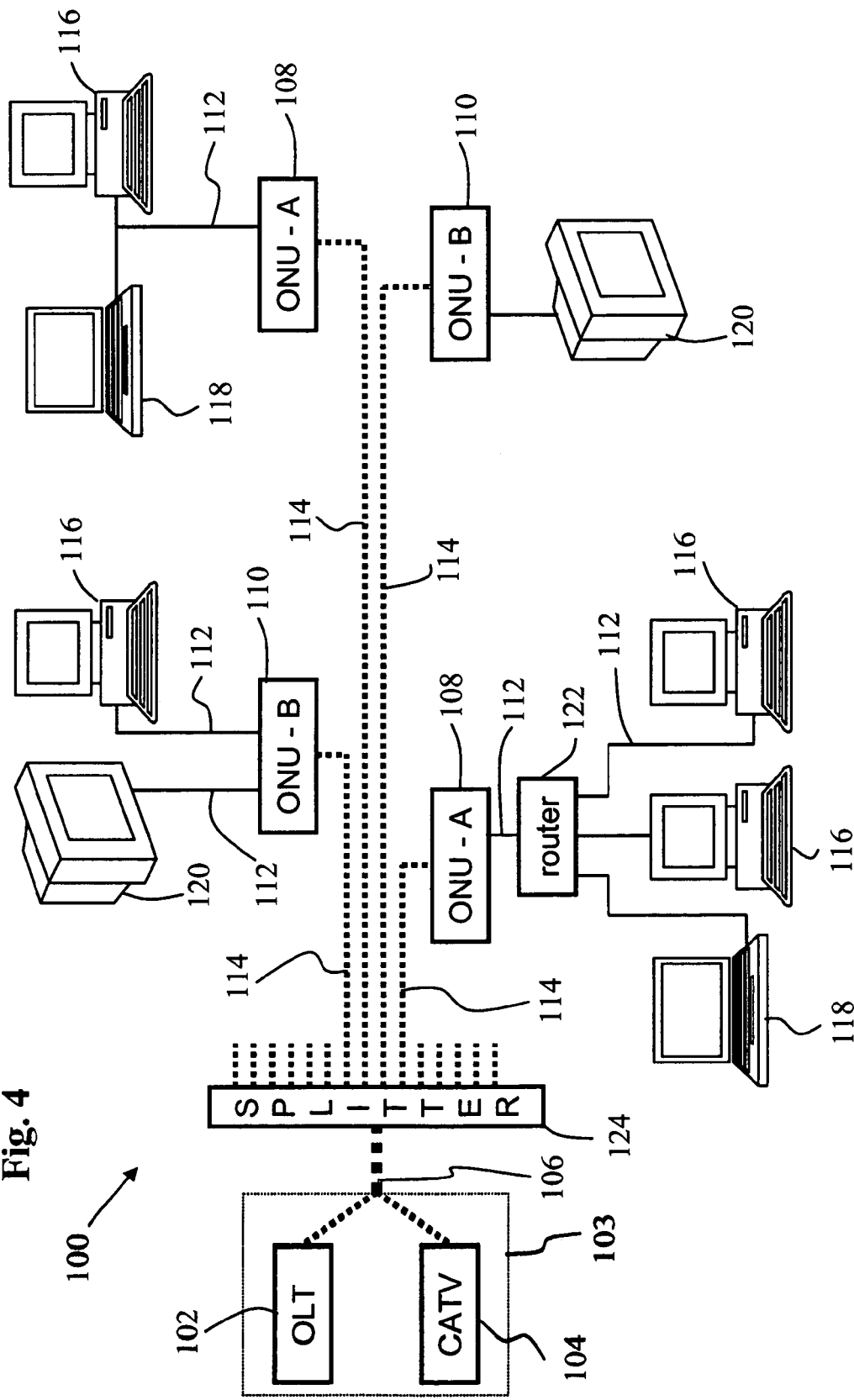
FIG. 4 is a block schematic diagram of a data communications system of the invention.

In another aspect of the invention depicted in FIG. 4, there is provided a communications system 100 for bidirectional optical message and signal transmission through a distribution optical fiber 106, which carries both low-power digital signals bidirectionally transmitted at a first and a second wavelength between a source 103 and a passive optical network and a high-power analog video signal transmitted at a third wavelength from the source 103 to the passive optical network. Preferably, the first and second wavelengths are shorter than the third wavelength. The video signal is provided by a CATV provider 104, while the digital data signals are sent to and from data provider 102. Both providers 102, 104, together comprising source 103, are linked to distribution optical fiber 106.

System 100 employs at least one optical network unit that interfaces with the user's data devices and/or television receivers. The system may employ any combination and number of "ONU-A" and "ONU-B" types. ONU-A types, such as the unit depicted in FIG. 2, provide duplex data communications at the first and second optical wavelengths and interface with any form of general purpose computer, router, or like data device. ONU-B types, such as the unit depicted in FIG. 3, provide both the aforesaid data communications and a video output, and may thus be interfaced with any of the data device types and/or with one or more conventional television sets, radio receivers, or video monitors. In the particular system shown in FIG. 4, each of a plurality of ONU-A devices 108 and ONU-B devices 110 is linked by a fiber optic service drop 114 to distribution fiber 106 through splitter 124. The optical network units, in turn, are connected by electrical wires 112, which may be either coaxial cables or twisted pairs, to various combinations of computers 116, 118, routers 122, and television receivers or monitors 120. Typically, the signal carried by distribution fiber 106 has enough intensity to allow it to be split using a conventional fiber signal splitter 124 to provide up to 16 outputs that may be connected to ONU's of either A or B type, or in some cases up to 32 outputs.

By way of contrast, an optical fiber communications system carrying superposed high power video and low power data signals in the aforesaid manner and implemented using optical network units incorporating three-port multiplexers of the form depicted in FIG. 1 is far more expensive and less flexible to implement than a system using the simpler filtering multiplexers provided by the present invention. As discussed hereinabove, the three-port multiplexer 1 of FIG. 1 is far more expensive to make than the units of the present invention, e.g. those of FIGS. 2–3. Moreover, the three-port multiplexer 1 must be provided to each user, whether or not the auxiliary video feed is needed or desired, because the $\lambda_3$ light must be removed to process the $\lambda_1$ and $\lambda_2$ signals without unacceptable cross-talk. In the present system, ONU-B units including the auxiliary video channel are provided only to users desiring both the data and video signals, whereas the ONU-A unit suffices for users needing only the data communications functions. The system is highly flexible, since the equipment for the auxiliary video channel may be readily installed or removed at any time, even subsequent to the initial installation. Such service operations do not require any precision alignment or other related skills beyond those needed for the initial installation.

The present system is highly compatible with existing data transmission, telephone, and CATV video infrastructure. Information content from each respective provider can be combined at a central location onto a conventional fiber, e.g. a single mode fiber. The simplicity and low cost of the present optical network unit, either with or without the auxiliary video channel, makes possible the widespread implementation of systems variously known in the art as fiber to the curb, cabinet, or building, or the like. In such optical fiber communications systems, information content is provided through optical fiber transmission. An optical network unit is located in locations at or proximate the user's premises, such as in a cabinet or similar enclosure mounted, e.g. on a utility pole servicing the user, on a pad near a building, in a nearby underground vault, or within a user's dwelling or business structure. The optical signals are converted to and from electrical signals as described hereinabove and distributed by twisted pair or coaxial cable to the user's appliances such as computers, routers, television and radio receivers, and the like.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Testing of an Optical Network Unit

Figure 5:
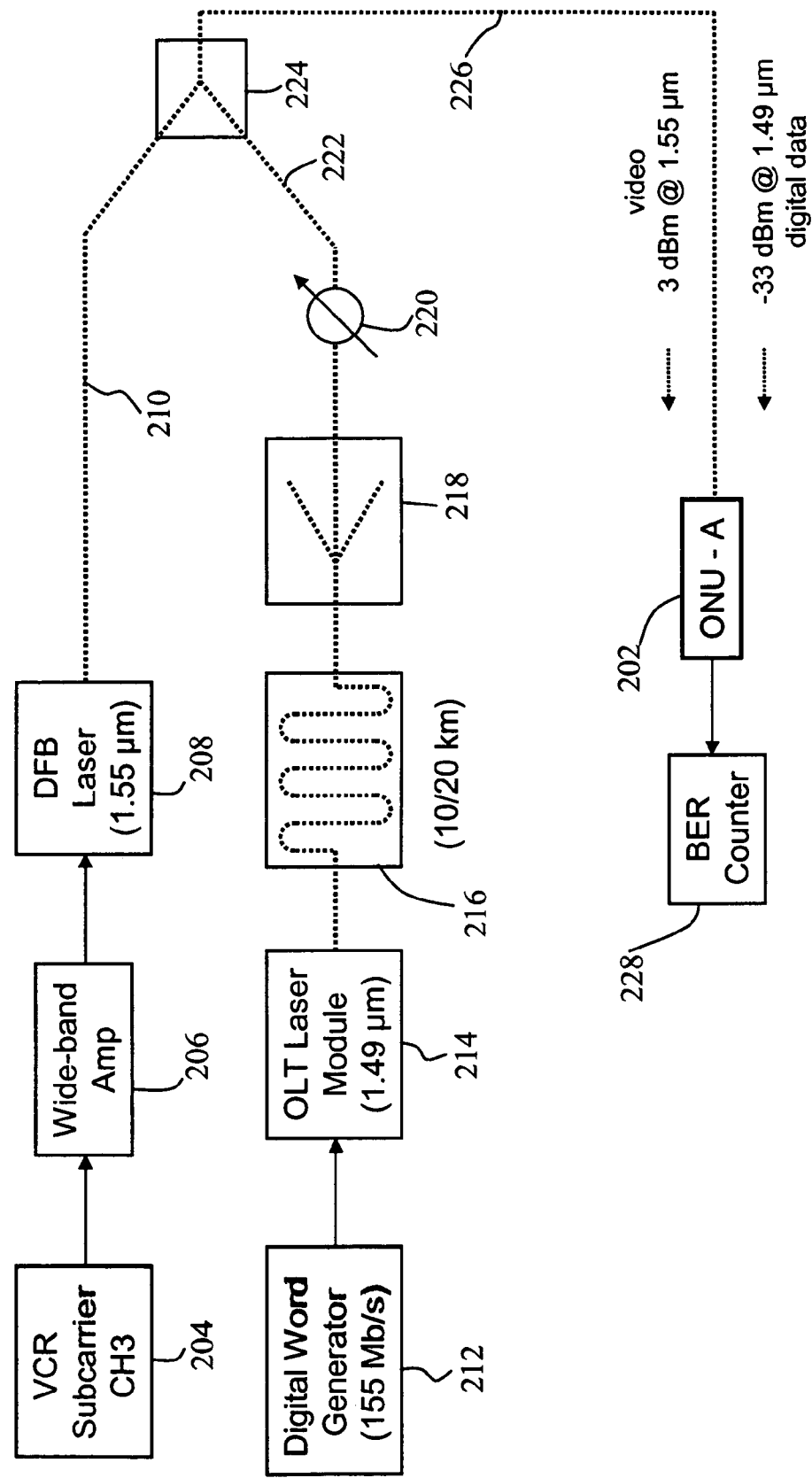
FIG. 5 is a block schematic diagram depicting a system for testing an optical network unit of the invention adapted to process data signals.

An ONU-A optical network unit 202 constructed in accordance with the present invention is tested using a system 200 shown schematically in FIG. 5. A video signal is prepared using a video subcarrier generated by a conventional VCR 204 and fed through a wideband amplifier 206. The electrical signal drives a high power laser 208 that provides an analog video optical signal having a power of about 6.5 dBm at a wavelength $\lambda_3$ of 1.55 µm and an 80% modulation in video fiber 210. A thermoelectrically cooled, distributed feedback laser is used. A data signal is generated using a standard laboratory digital word generator 212 operating at a rate of about 155 Mb/s and connected to a laser light module 214 to produce a digital optical signal at $\lambda_2 = 1.49$ µm. The signal is fed through a single mode optical fiber 216 either 10 or 20 km long and then through a conventional 16-way optical splitter 218 and then through a variable optical attenuator 220. The low power digital and high power analog video signals in video fiber 210 and data fiber 222 are then combined in a conventional fiber splitter 224 to produce a combined optical signal containing a video component with a power of about 3 dBm at 1.55 µm and a digital data component with a power of about −33 dBm at 1.49 µm in output fiber 226. The combined signal is connected to an ONU-A module 202 wherein a blocking filter limits the entry of 1.55 µm light into the receiver. The data output from the ONU is connected to a bit error rate (BER) counter 228 that demonstrates the integrity of the digital data, as evidenced by a BER of less than $10^{-10}$.

EXAMPLE 2

Testing of an Optical Network Unit with Video Output

Figure 6:
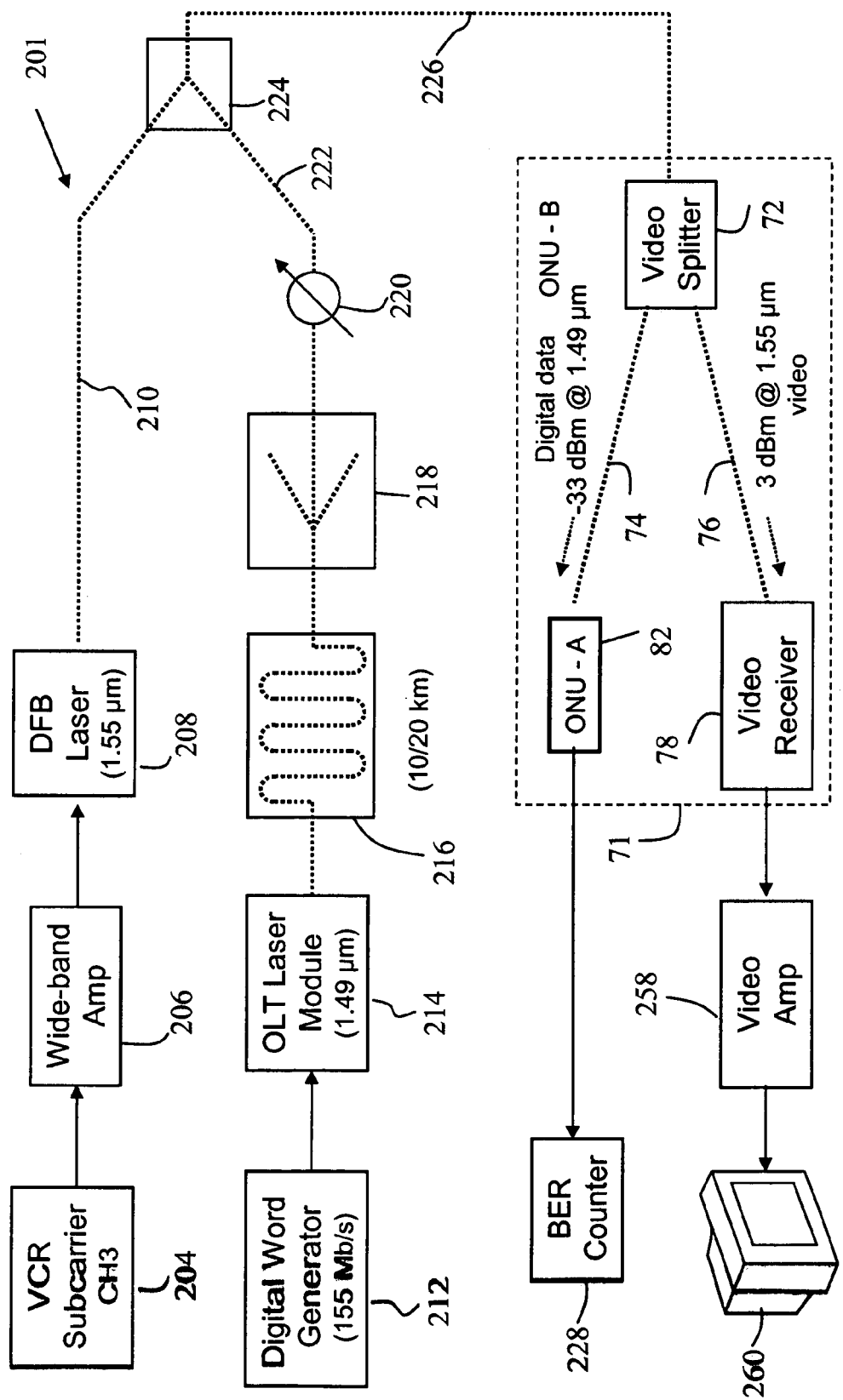
FIG. 6 is a block schematic diagram depicting a system for testing an optical network unit of the invention adapted to process both data and video signals.

An ONU-B optical network unit 203 is constructed in accordance with the present invention and then tested using a system 201 shown schematically in FIG. 6. A combined optical signal is prepared using the same system employed in Example 1 and having the characteristics described therein. The combined optical signal is fed to a WDM mirror-based video splitter 72 that directs a portion of the 1.55 µm component through video output fiber 76 to an optical video receiver 78 and a video amplifier 258 connected to a television set 260. The integrity of the video signal is confirmed by observation of the screen image reproduced on the television set. A portion of the incident signal is also routed by the video splitter 72 through data fiber 74 to a bi-directional multiplexer 82 of the ONU-A type. The data output of the multiplexer 82 is connected to a BER counter 228 that demonstrates the integrity of the digital data as evidenced by a BER of less than $10^{-10}$.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A communications system for bidirectional optical data transmission through an optical fiber having a longitudinal axis and a fiber end and carrying low-power digital signals bidirectionally transmitted at a first and a second wavelength and a high-power analog video signal transmitted at a third wavelength between a source and at least one optical network unit, said first and second wavelengths being shorter than said third wavelength, and said at least one optical network unit comprising:

a housing having a connection for said optical fiber; and an optical filter, first and second optical units, and a beam splitter mounted in said housing; said first optical unit being disposed along said longitudinal axis and comprising a transmitter including an input for receiving a transmission electrical signal and a light source for emitting light at said first wavelength along said longitudinal axis through said beam splitter and said filter into said optical fiber, said light being modulated by said transmission electrical signal;

said second optical unit being disposed adjacent said longitudinal axis and comprising a receiver including a light detector for receiving modulated light of said second wavelength and an output, said receiver detecting said modulated light incident on said light detector and converting said modulated light into a received electrical signal at said output;

said beam splitter being disposed obliquely along said longitudinal axis and diverting at least a portion of light of said second wavelength incident thereon from said optical fiber into said second optical unit and passing at least a portion of light of said first wavelength emitted by said first optical unit into said optical fiber;

said optical filter being interposed between said beam splitter and said second optical unit, and being adapted to block light of a third wavelength but bidirectionally transmit light of said second wavelength and an auxiliary video channel having a video splitter interposed between said optical fiber and said housing, said video splitter having an optical fiber input connected to said optical fiber and video and data optical fiber outputs, and a video receiver connected to said video optical fiber output, said video receiver having a video light detector and an output suitable for at least one of a television receiver, a radio receiver, and a video monitor.

2. A communications system as recited by claim 1, wherein the attenuation of light of said third wavelength by said optical filter exceeds the attenuation of light of said first and second wavelengths by at least about 40 dB.

3. A communications system as recited by claim 1, wherein said video splitter and said video receiver are contained within a video housing to form a video module.

4. A communications system as recited by claim 1, comprising a plurality of said optical network units, at least one of which further comprises an auxiliary video channel having a video splitter interposed between said optical fiber and said housing, said video splitter having an optical fiber input connected to said optical fiber and video and data optical fiber outputs, and a video receiver connected to said video optical fiber output, said video receiver having a video light detector and an output suitable for at least one of a television receiver, a radio receiver, and a video monitor.

5. For use in a communications system for bidirectional data transmission through an optical fiber having a longitudinal axis and a fiber end and carrying low-power digital signals bidirectionally transmitted at a first and a second wavelength and a high-power analog video signal transmitted at a third wavelength, an optical network unit comprising:

a housing having a connection for said optical fiber; and an optical filter, first and second optical units, and a beam splitter mounted in said housing; said optical filter being interposed between said fiber end and said beam splitter, and being adapted to block light of said third wavelength but bidirectionally transmit light of said first and second wavelengths;

said first optical unit being disposed along said longitudinal axis and comprising a transmitter including an input for receiving a transmission electrical signal and a light source for emitting light at said first wavelength along said longitudinal axis through said beam splitter and said filter into said optical fiber, said light being modulated by said transmission electrical signal;

said second optical unit being disposed adjacent said longitudinal axis and comprising a receiver including a light detector for receiving modulated light of said second wavelength and an output, said receiver detecting said modulated light incident on said light detector and converting said modulated light into a received electrical signal at said output;

said beam splitter being disposed obliquely along said longitudinal axis and diverting at least a portion of said second wavelength light incident thereon from said optical filter into said second optical unit and passing at least a portion of said light of said first wavelength emitted by said first optical unit into said optical fiber; and an auxiliary video channel having a video splitter interposed between said optical fiber and said housing, said video splitter having an optical fiber input connected to said optical fiber and video and data optical fiber outputs, and a video receiver connected to said video optical fiber output, said video receiver having a video light detector and an output suitable for at least one of a television receiver, a radio receiver, and a video monitor.

6. An optical network unit as recited by claim 5, wherein the attenuation of light of said third wavelength by said high-pass optical filter exceeds the attenuation of light of said first and second wavelengths by at least about 40 dB.

7. For use in a communications system for bidirectional data transmission through an optical fiber having a longitudinal axis and a fiber end and carrying low-power digital signals bidirectionally transmitted at a first and a second wavelength and a high-power analog video signal transmitted at a third wavelength, an optical network unit comprising:

a housing having a connection for said optical fiber; and an optical filter, first and second optical units, and a beam splitter mounted in said housing; said first optical unit being disposed along said longitudinal axis and comprising a transmitter including an input for receiving a transmission electrical signal and a light source for emitting light at said first wavelength along said longitudinal axis through said beam splitter and said filter into said optical fiber, said light being modulated by said transmission electrical signal;

said second optical unit being disposed adjacent said longitudinal axis and comprising a receiver including a light detector for receiving modulated light of said second wavelength and an output, said receiver detecting said modulated light incident on said light detector and converting said modulated light into a received electrical signal at said output;

said beam splitter being disposed obliquely along said longitudinal axis and diverting at least a portion of light of said second wavelength incident thereon from said optical fiber into said second optical unit and passing at least a portion of light of said first wavelength emitted by said first optical unit into said optical fiber;

said optical filter being interposed between said beam splitter and said second optical unit, and being adapted to block light of a third wavelength but bidirectionally transmit light of said second wavelength; and an auxiliary video channel having a video splitter interposed between said optical fiber and said housing, said video splitter having an optical fiber input connected to said optical fiber and video and data optical fiber outputs, and a video receiver connected to said video optical fiber output, said video receiver having a video light detector and an output suitable for at least one of a television receiver, a radio receiver, and a video monitor.

8. An optical network unit as recited by claim 7, wherein the attenuation of light of said third wavelength by said high-pass optical filter exceeds the attenuation of light of said second wavelength by at least about 40 dB.

9. An optical network unit as recited by claim 7, wherein said video splitter and said video receiver are contained within a video housing to form a video module.

10. An optical network unit as recited by claim 7, wherein said video splitter employs a wavelength division multiplexing mirror.

* * * * *